United States Patent [19] [11] 4,052,309
Holzer et al. [45] Oct. 4, 1977

[54] PROCESS OF ELECTRODEPOSITION OF COATING COMPOSITIONS CONTAINING AN AMMONIA COMPLEX

[75] Inventors: Franz Holzer; Gerhard Schmolzer, both of Graz, Austria

[73] Assignee: Vianova Kunstharz, A.G., Vienna, Austria

[21] Appl. No.: 541,122

[22] Filed: Jan. 15, 1975

Related U.S. Application Data

[63] Continuation of Ser. No. 303,400, Nov. 3, 1972.

[30] Foreign Application Priority Data

Nov. 8, 1971  Austria ............................... 9589/71

[51] Int. Cl.² .......................................... C25D 13/10
[52] U.S. Cl. .................................................. 204/181
[58] Field of Search ........................................ 204/181

[56] References Cited

U.S. PATENT DOCUMENTS

| | | | |
|---|---|---|---|
| 3,579,429 | 5/1971 | Manson et al. | 204/181 |
| 3,657,169 | 4/1972 | Levine et al. | 204/181 |
| 3,699,030 | 10/1972 | Gilchrist | 204/181 |

Primary Examiner—Howard S. Williams
Attorney, Agent, or Firm—A. W. Breiner

[57] ABSTRACT

Improved coating compositions suitable for electrodeposition are described which comprise one or more water-soluble binding agents which can be deposited anodically under the action of applied current in an aqueous medium, and at least partially soluble ammonia complexes of salts of metals which are capable of forming ammoniacates. These coating compositions provide improved throwing power without detrimental effect to the properties of the finished coating.

7 Claims, No Drawings

4,052,309

PROCESS OF ELECTRODEPOSITION OF COATING COMPOSITIONS CONTAINING AN AMMONIA COMPLEX

This is a continuation of application Ser. No. 303,400 filed Nov. 3, 1972.

FIELD OF INVENTION

The present invention relates to improved paint compositions suitable for electrodeposition. More particularly, the invention relates to paint compositions primarily for electrodeposition which have excellent throwing power. The compositions comprise one or more watersoluble binders or binding agents in an aqueous medium which can be deposited anodically under the action of applied current, and at least partially soluble ammonia complexes of salts of metals which will form ammoniacates. Preferably, the compositions will contain pigments, fillers, or other additives.

BACKGROUND OF INVENTION

Coating compositions applied by electrodeposition are used extensively in various industries and particularly to coat or paint automobiles. In recent years the performance standards imposed by the automobile industry on paint formulations have become increasingly rigid particularly with regard to corrosion resistance and throwing power. At the same time, shorter cure time of the coatings are being demanded. Paint manufacturers have made efforts to meet these demands through careful selection of pain components such as the binding media, specific pigments, and the like. For example, it has been found that the corrosion resistance of a paint can be influenced, or modified, through the use of anti-corrosive pigments and/or binding media which are unsaponifiable to the greatest extent possible, and which have sufficient functionality for cross-linking reactions during the curing process.

The throwing or penetration of a paint composition, defined herein as the property of an electrodeposition paint to deposit on places which are shielded from the electrode whereby only a low current density is available to effect deposition, can be improved through modification of the binding agent either by the neutralizing agent employed or by the binder components. Moreover, throwing power can be increased by introducing auxiliary electrodes into the electrodeposition tank to reach the shielded zones. This later method is only accepted by the paint consumer as a last resort since it is costly, both with regard to personnel and equipment. It is also possible to improve the throwing power of electrodeposition paint media by increasing the conductivity of the paint. This can be done either by adding low molecular weight resol carboxylic acids which participate in the film formation, or by neutralizing an adequate binding agent with an inorganic base, particularly with KOH. However, if these methods are used, in many instances the corrosion resistance is substantially reduced. Optimization of both properties in the same formulation is largely impossible. An additional way of improving the throwing power is to develop binding media which have an extremely high electrical resistance of the deposited film. Deposition of such paint media requires very high voltages which in turn necessitates very costly equipment.

OBJECTS OF INVENTION AND BRIEF DESCRIPTION

Accordingly, it is an object of this invention to provide a process for making a coating composition having improved throwing power, without adversely affecting other properties.

It is another object of this invention to provide a coating composition having improved throwing power, without adversely affecting other properties.

It is still another object of this invention to provide a coating composition which can be applied using standard electrodeposition techniques while obtaining a uniform coating on the entire article being coated including hollow sections, hidden sections, or the like.

These and other objects of the invention will be more readily apparent from the following detailed description, noting particularly the illustrative examples.

The objects of this invention are realized through the discovery that the throwing power of electrodeposition paint can be improved substantially without other properties being adversely affected if the paint contains at least partially soluble ammonia complexes of metal salts of such metals of the Periodic Table which are capable of forming ammoniacates. Ammoniacates, as the term is used herein, are complexes of ammonia and metal salts capable of forming ammoniacates, such as zinc salts of phosphoric acid.

The invention is primarily concerned, therefore, with electrodeposition paints and the preparation of electrodeposition paints comprising (A) one or more water-soluble binding agents which can be deposited anodically under the action of applied current and which optionally can contain water-tolerant and/or, in minor amounts, water-insoluble auxiliary solvents; (B) water; and (C) at least partially soluble ammonia complexes of salts of those metals of the Periodic System which are capable of forming ammoniacates. Metal salts particularly suitable for use herein are the metal salts of Groups IB, IIB, and VII exemplified by zinc, cadmium, copper, silver, nickel, and cobalt. The acid radical of the salts is not critical. In general, all acid radicals can be employed as long as the acid radical does not lead to defects in the film formation upon electrodeposition. Those skilled in the art are familiar with this possible phenomenon which may be cause in certain systems, for example, by halogenates, and to a lesser extent by sulfates or nitrates. For the present process, phosphates and chromates are preferred. Particularly suitable are the zinc salts of phosphoric acid.

A further increase or improvement in throwing power can be achieved by jointly using the described complexes with chromates of metals which do not form ammoniacates which are partially soluble in water, for example, chromates of strontium, lead, barium, etc. However, attempts to use salts of aluminum, which as known are not capable of forming ammonia complexes, failed.

The binder and binding agent used in accordance with the present invention are those commercially available and conventionally utilized in coating compositions applied by electrodeposition. These coatings include the binders referred to in U.S. Pat. Nos. 3,230,162; 3,658,736; 3,300,424; 3,340,172; 3,403,088; 3,530,054; 3,658,795; and 3,527,721. Specific binders or binding agents may be preferable in select systems over others as will be apparent from the aforesaid patents and as known to one skilled in the art.

The compositions of this invention may be applied as clear films or they can be used with a pigment composition of any conventional types comprising, for example, iron oxides, lead oxides, strontium chromate, carbon black, titanium dioxide, talc, barium sulfate and the like, as well as any combination of the aforesaid and similar fillers. Color pigments such as cadmium yellow, cadmium red, phthalocyanine blue, chromic yellow, toluidine red, hydrated iron oxide, and the like may be included if desired as can be dispersing or surface active agents. Additionally, fillers which may not be classified as pigments including the aluminum silicates and other additives such as anti-oxidants, wetting agents, driers, anti-foaming agents, bacteriacides, suspending agents, and the like may optionally be included in the compositions. The selection of these pigments, fillers, and other additives is conventional to the art and does not form a part of the present invention.

The preparation of the paints of the invention can be carried out by various methods:

1. A pigment paste can be made according to known methods from un-neutralized binders, pigments, and extenders if desired, and a solution of the ammonia complex in ammonia and/or amines is added to the paste. The pH-value of the paste is adjusted with the ammonia or amine base adequate to the binding medium and the concentration is reduced with de-ionized water to the solid content required for application;

2. The dissolved ammonia complex is added to the dilute paint. This method is also suitable for tanks in operation either for making additions or for feeding acidic material in order to maintain the bath concentration; and 3. With a paint media which is partially or completely neutralized with ammonia the complex can be formed in situ. In this case the solid metal salt is milled with the binder together with the pigments and fillers. After neutralization with ammonia, the paint will exhibit the properties of the compositions of the present invention as a result of the in situ formation of the ammonia complex.

The ammonia complex which is employed in accordance with methods 1 or 2 above, or in a modification of the aforesaid methods, is made by forming a slurry or solution of a metal salt such as zinc phosphate and concentrated ammonia is added, while slightly warming, until the salt is completely dissolved. Water is added to the solution in order to obtain the desired metal concentration. The solution is ready for use. In instances where an amine neutralized binder is employed, it is advantageous to eliminate excess ammonia by warming the solution to drive off the ammonia. The solution can be diluted with water and, if desired, small amounts of ammonia or amine can be co-employed.

The amount of complex forming metal salt to obtain the increased throwing power in accordance with the present invention will range from about 0.05 to 10 percent of metal solids based on the binder solids. The preferably used amounts correspond to about 1 to 3 percent of metal solids based on tertiary zinc phosphate in relation to the binder solids.

ILLUSTRATIVE EMBODIMENTS AND COMPARATIVE DATA

A series of paint formulations were made up for use in illustrative examples which follow. In these formulations, the resin binders are as follows:

Resin I: A maleic adduct with polybutadiene prepared in accordance with Example 4 of U.S. Patent Application Ser. No. 160,884, filed July 8, 1971.

Resin II: A maleic adduct with polybutadiene, made in accordance with Example 2 of U.S. Pat. No. 3,658,795.

Resin III: A water dilutable, stoving synthetic resin prepared according to U.S. Ser. No. 55,571 filed July 16, 1970. This resin is sold commercially by Vianova Kunstharz AG, Austria, under the trademark, Resydrol ® E 452.

Resin IV: A water-dilutable thermosetting synthetic resin prepared according to Example 2 of the U.S. Application Ser. No. 55,571, filed July 16, 1970.

Resin V: A water-soluble thermosetting epoxy resin ester, 70 percent in ethylglycol, viscosity, 50 percent in butyl glycol, at 20° C., 250–360 cP. This resin is available commercially from Vianova Kunstharz AG, Austria, under the trademark Resydrol ® VWE 32/1 E.

Pigments and fillers were employed as follows:

Table 1

| Paint Ref. | TiO$_2$ | Red Iron Oxide | Carbon Black | Aluminum silicate | Strontium chromate | Lead silico-chromate |
|---|---|---|---|---|---|---|
| A | 16 | — | 1 | 13 | — | — |
| B | — | 16 | — | 12 | 1 | 1 |
| C | 19 | — | — | 18 | — | — |
| D | — | — | 3 | 7 | — | — |

Throwing power of the system was determined as follows:

A mild steel strip of 560 × 50 mm. (0.3 mm. thick) is wired as the anode in a cylinder of non-conductive material of 55 mm. diameter and 550 mm. height, filled with the paint. At the bottom of the cylinder a metal disc represents the cathode. The paint is filled to a height of 500 mm., the metal strip is dipped into the paint at a length of 480 mm. Voltage is applied and a film deposits on the anode. Decreasing film thickness with increasing distance from the cathode is a result of the falling voltage. The film thickness at the various measuring points is a measure for the throwing power of the paint under test. The measuring points are:

2 cm. (A), 32 cm. (B), 36 cm. (C), 41 cm. (D), and 46 cm. (E) from the lower end of the panel.

For the quality of the throwing power, or the desired throwing power, high values for C, D, and E are essential, as well as the relation between A and E, showing the gradient of film thickness, i.e., A and E should be close together.

EXAMPLE 1

Paints were prepared from various types of binding media and various neutralizing agents as shown in Table 2. The ammonia complex was made as earlier described and added as a 5 percent aqueous solution calculated on the metal content. The blank run was conducted on paints utilizing the same pigment paste. The results of the tests are also set forth in Table 2.

As apparent from the data of Table 2, the paint formulations comprising the ammonia complex provide greatly superior throwing power with no adverse effect on corrosion resistance as determined by the salt spray tests. Further, the stability of the emulsion is not decreased.

Table 2

| Paint Ref. | Resin No. | Method of Preparation | Neutral. Agent | Operating pH-value | Ammonia complex (% Zn) | Time s | Voltage V | A | B | C | D | E | Salt spray ASTM B117-64 on Bo 125 in mm. | Tropical climate 240 h, 50° C. on Bo 125 | Stirring stability 1 week/40 (×) |
|---|---|---|---|---|---|---|---|---|---|---|---|---|---|---|---|
| B | II | — | TEA | 7,0 | — | 90 | 360 | 30 | 10 | 6 | 3 | 0 | 1 (240$^h$) | Unchanged | 3 |
| B | II | 2 | TEA | 7,0 | 1 | 90 | 360 | 28 | 16 | 14 | 13 | 13 | 2 (240$^h$) | " | 2 |
| D | III | — | DEA | 7,5 | — | 90 | 280 | 32 | 8 | 5 | 1 | 0 | 3 (150$^h$) | " | 2 |
| D | III | 2 | DEA | 7,5 | 1 | 90 | 280 | 28 | 11 | 10 | 9 | 7 | 3 (150$^h$) | " | 3 |
| A | III | — | NH$_3$ | 7,6 | — | 90 | 240 | 26 | 7 | 5 | 2 | 0 | 4 (150$^h$) | " | 2 |
| A | III | 1 | NH$_3$ | 7,6 | 1 | 90 | 240 | 20 | 10 | 9 | 8 | 7 | 3 (150$^h$) | " | 3 |
| C | IV | — | NH$_3$ | 7,2 | — | 90 | 180 | 24 | 11 | 9 | 7 | 6 | 5 (150$^h$) | " | 1 |
| C | IV | 3 | NH$_3$ | 7,2 | 1 | 90 | 180 | 24 | 13 | 12 | 12 | 10 | 2 (150$^h$) | " | 1 |

Notes:
(×) = stirring in open container
Grading = 1 is very good; 5 is very poor
Coatings were deposited on metal plating, Bonder 125, for evaluation

EXAMPLE 2

Paint formulations were made containing varying amounts of tertiary zinc phosphate ammonia complexes in accordance with method 3 above. The paint formulations comprises pigments and fillers of paint A as set forth in Table 1, the resinous binder being Resin I, the paints were neutralized with ammonia to an operating pH-value of 7.0. The deposition time at 220 volts was 90 seconds. The evaluation of the paint formulation is shown in Table 3.

Table 3

| NH$_3$ Complex Zinc Phosphate % +) | Chromate pigment % +) | Throwing Power | | | | | | | | | |
|---|---|---|---|---|---|---|---|---|---|---|---|
| | | after 24 hours of stirring film thickness, μm | | | | | after stirring stability test +)+) film thickness, μm | | | | |
| | | A | B | C | D | E | A | B | C | D | E |
| a | — | — | 34 | 11 | 9 | 6 | 3 | 24 | 10 | 8 | 5 | 3 |
| b | — | 2 | 24 | 13 | 9 | 7 | 4 | 20 | 12 | 9 | 6 | 4 |
| c | 1 | — | 22 | 15 | 13 | 11 | 10 | 19 | 13 | 11 | 10 | 10 |
| d | 2 | — | 22 | 15 | 15 | 14 | 12 | 20 | 15 | 15 | 14 | 13 |
| e | 3 | — | 21 | 16 | 15 | 14 | 13 | 19 | 15 | 15 | 15 | 14 |
| f | 2 | 2 | 18 | 17 | 16 | 16 | 15 | 18 | 16 | 15 | 15 | 15 |

+) on resin solids
+)+) stirring at 40° C. in open container, test made after 1 week In Table 3, test a) is the blank, test b) represents the blank containing chromates. Test f) established the synergistic effect of the ammonia complex and chromate pigments. Tests c) -e) establish the increased throwing power due to the presence of the NH$_3$ complex. As apparent from the data, the addition of the ammonia complex greatly increases the throwing power of the compositions.

EXAMPLE 3

Paints containing varying amounts of tertiary zinc phosphate or strontium chromate, not complexed with ammonia, were prepared according to method 3 above. The filler and pigment content of the paint is as shown in paint A of Table 1. The resinous binder is Resin V. The formulation was neutralized with ammonia to an operating pH-value of 8.5. The time of deposition at a voltage of 200 volts was 90 seconds.

Table 4

| Zinc phosphate % +) | Chromate pigment % +) | Throwing Power | | | | | | | | | |
|---|---|---|---|---|---|---|---|---|---|---|---|
| | | after 24 hours of stirring film thickness, μm | | | | | after stirring stability test +)+) film thickness, μm | | | | |
| | | A | B | C | D | E | A | B | C | D | E |
| a | — | — | 22 | 5 | 4 | 3 | 2 | 20 | 4 | 2 | — | — |

Table 4-continued

| Zinc phosphate % +) | Chromate pigment % +) | Throwing Power | | | | | | | | | |
|---|---|---|---|---|---|---|---|---|---|---|---|
| | | after 24 hours of stirring film thickness, μm | | | | | after stirring stability test +)+) film thickness, μm | | | | |
| | | A | B | C | D | E | A | B | C | D | E |
| b | — | 1 | 18 | 8 | 6 | 6 | 5 | 18 | 7 | 5 | 4 | |
| c | — | 2 | 17 | 10 | 8 | 6 | 5 | 16 | 8 | 4 | 3 | |
| d | 1 | — | 15 | 8 | 7 | 4 | 2 | 16 | 10 | 6 | 3 | |

+) on resin solids
+)+) stirring at 40° C. in open container, test made after 1 week As apparent, the throwing power of the paint formulation using method 3 is equally increasing the throwing power, especially in respect of the relation between A and E and the values of the aged bath.

EXAMPLE 4

An ammonia complex is prepared from copper phosphate (Cu$_2$(PO$_4$)$_3$) and concentrated ammonia. The paint formulation is neutralized and diluted according to method 1. The evaluation of the paint is set forth in Table 5.

Table 5

| Paint | Resin | Neutral. Agent | Ammonia complex (% Cu) | time s | tage V | Throwing power | | | | |
|---|---|---|---|---|---|---|---|---|---|---|
| | | | | | | A | B | C | D | E |
| A | I | NH$_3$ | — | 90 | 200 | 30 | 9 | 7 | 4 | 2 |
| A | I | NH$_3$ | 1 | 90 | 200 | 15 | 15 | 12 | 10 | 7 |

As apparent from Table 5, the presence of the ammonia complex greatly increases the throwing power in regions C, D, and E. Furthermore, the gradient A - E is much narrower.

EXAMPLE 5

Paints were prepared according to method 3 containing various phosphates. The paint formulations and characterizing data is set forth in Table 6.

Table 6

| Paint | Resin | Neutral. Agent | Phosphate (% metal) | time s | voltage V | Throwing power | | | | |
|---|---|---|---|---|---|---|---|---|---|---|
| | | | | | | A | B | C | D | E |
| B | I | NH$_3$ | — | 90 | 180 | 20 | 5 | 1 | 0 | 0 |
| B | I | NH$_3$ | 2 Zn | 90 | 180 | 20 | 15 | 12 | 12 | 10 |
| B | I | NH$_3$ | 2 Cd | 90 | 180 | 24 | 12 | 9 | 7 | 6 |
| B | I | NH$_3$ | 2 Al | 90 | 180 | 27 | 6 | 5 | 2 | 0 |
| B | I | TEA | 2 Zn | 90 | 180 | 22 | 5 | 3 | 1 | 0 |

As apparent from the data, aluminum phosphate, which will not form a complex with ammonia, has virtually no effect on the throwing power. Zinc phosphate, when employed with tri-ethanol amine has no effect since an ammonia complex is not formed. In contradistinction, when ammonia is utilized as the neutralizing agent, where an ammonia complex is formed in situ, the throwing power is substantially increased.

As will be apparent from the aforesaid examples, the presence of the ammonia complexes of metal salts greatly increases the throwing power of a paint formulation when electro-deposited without detracting from the other essential characteristics of the paint including corrosion resistance, stability, etc. As will be apparent to one skilled in the arts, various modifications can be made to the paint formulations above described without departing from the inventive concept herein disclosed. Such modifications, being within the ability of one skilled in the art are covered by the present invention.

It is claimed:

1. The method of coating a substrate by electrodeposition comprising (1) providing a paint formulation comprising (A) at least one water-soluble binding agent which can be deposited anodically under the action of applied current, and (B) in an amount sufficient to increase the throwing power of said paint formulation a partially soluble ammonia complex of a salt of a metal of the group consisting of zinc, cadmium, copper, silver, nickel, and cobalt which is capable of forming an ammoniacate; and (2) forming an electrical circuit comprising an anode and cathode with said anode eing said substrate being coated and said substrate being in contact with said paint formulation of (1) while an electrodeposition current is applied to said substrate, the throwing power of said paint being increased due to the presence of said ammonia complex.

2. The method according to claim 1 wherein the metal salts are phosphates or chromates.

3. The method according to claim 1 wherein the ammonia complexes are added in an amount of from 0.05 − 10 percent metal based on binder solids.

4. The method according to claim 1 wherein the pH-value of the paint is adjusted with ammonia or an organic nitrogen base.

5. The method according to claim 1 wherein said paint additionally contains at least partially water-soluble chromates of metals which do not form ammonia complexes.

6. The method according to claim 1 wherein said paint contains water-tolerant and/or, in minor amounts, water-soluble auxiliary solvents.

7. The method according to claim 1 wherein said paint includes pigments, fillers, or other additives.

* * * * *